US006886679B2

(12) United States Patent
Katsnelson et al.

(10) Patent No.: US 6,886,679 B2
(45) Date of Patent: May 3, 2005

(54) AXIAL SETTING DEVICE WITH SPRING-SUPPORTED RETURN

(75) Inventors: Alexey Katsnelson, Düsseldorf (DE); Adrian Chludek, St. Augustin (DE); Andreas Kelbel, Berlin (DE); Kurt Müller, Merzenich (DE)

(73) Assignee: GKN Driveline International GmbH (DE)

( * ) Notice: Subject to any disclaimer, the term of this patent is extended or adjusted under 35 U.S.C. 154(b) by 0 days.

(21) Appl. No.: 10/744,357

(22) Filed: Dec. 23, 2003

(65) Prior Publication Data

US 2004/0134724 A1 Jul. 15, 2004

(30) Foreign Application Priority Data

Dec. 23, 2002 (DE) .......................... 102 61 516

(51) Int. Cl.⁷ .............................................. F16H 25/08
(52) U.S. Cl. .................. 192/226; 192/70.24; 192/93 A
(58) Field of Search ............................. 192/226, 58.41, 192/93 A, 70.24, 84.91, 84.6; 188/134, 135, 137, 141, 171, 173; 74/56, 89, 89.16

(56) References Cited

U.S. PATENT DOCUMENTS

| 4,294,340 A | * | 10/1981 | Kunze ...................... 192/56.54 |
| 4,950,214 A | * | 8/1990 | Botterill ...................... 475/231 |
| 5,890,573 A | * | 4/1999 | Kwoka ........................ 192/35 |
| 6,003,395 A | * | 12/1999 | Rogg et al. ................... 74/335 |
| 6,578,693 B2 | * | 6/2003 | Mayr .......................... 192/226 |
| 6,715,375 B2 | * | 4/2004 | Nestler ........................ 74/340 |
| 2001/0047919 A1 | * | 12/2001 | Mayr ...................... 192/93 A |
| 2002/0194941 A1 | * | 12/2002 | Hulsebusch et al. ....... 74/89.16 |

FOREIGN PATENT DOCUMENTS

| DE | 38 15 225 C2 | 11/1989 |
| DE | 690 19 929 T2 | 12/1995 |
| DE | 196 50 039 A1 | 6/1997 |
| DE | 100 33 482 A1 | 10/2001 |
| DE | 100 33 484 A1 | 1/2002 |
| DE | 101 29 795 A1 | 1/2003 |

* cited by examiner

Primary Examiner—Chris Schwartz

(57) ABSTRACT

An axial setting device having two discs (24, 29) which are rotatable relative to one another, which are supported coaxially relative to one another and between which there are guided balls (35) in pairs of ball grooves (34, 39) whose depth varies across the circumference. One of the discs (24, 29) is axially supported and one is axially displaceable against elastic returning forces of first spring (33). At least one of the discs can be driven by a motor (11) via a gear drive. During the return movement of the discs (24, 29) after the balls (35) have reached their end position in the ball grooves, which end position is defined by the greatest groove depth, a second spring permits overshooting of the drivable disc (24) together with the disc (29) supported with respect to rotation against elastic returning forces of the second spring.

14 Claims, 3 Drawing Sheets

AXIAL SETTING DEVICE WITH SPRING-SUPPORTED RETURN

BACKGROUND OF THE INVENTION

The invention relates to an axial setting device comprising two discs which are rotatable relative to one another, and which are supported coaxially relative to one another in a housing. Between the two discs, there are guided balls in pairs of ball grooves whose depth varies across the circumference. One of the discs is axially supported and the other one of the discs is axially displaceable against elastic returning forces of a first spring. One of the discs can be rotatingly driven by a motor via a gear drive, whereas the other one of the discs is supported in the housing with respect to rotation.

In the disclosed embodiment, the rotatingly driven disc can also be the axially displaceable disc, whereas the disc held with respect to rotation can, at the same time, be directly axially supported in the housing. Alternatively, the axially supported disc can be rotatingly driven, and the axially displaceable disc which, in turn, is supported on same via the balls, can be held with respect to rotation.

For actuating the axial setting device, the motor is driven in a first direction of rotation, wherein the one of the discs connected to the motor via reduction stages is rotated, with the balls rolling by half the angle of rotation of the driven disc on the disc held with respect to rotation. The axially displaceable disc, in turn, supported via the balls on the disc axially supported in the housing, is axially displaced against elastic returning forces of the first spring.

The balls resting in a starting position against end stops in the pairs of ball grooves, which balls, at the same time, are positioned in the deepest groove portions, as a result of the relative rotation of the discs relative to one another, move by approximately half the angle of rotation towards flatter groove portions. As a result, the discs push away from one another and reach an operating region in which they can apply axial setting forces.

If, starting from the operating region of the discs, the motor is de-energized, the elastic returning forces of the first spring as applied to the axially displaceable disc cause the latter to be pushed back. The at least one rotatingly drivable disc is rotated back due to the effect of the balls in the ball grooves, until the balls in their pairs of ball grooves simultaneously stop against the end stops. Substantially the same happens if, starting from the operating region of the discs, the motor is driven in the opposite direction until the discs again reach the starting position, and until the balls in their pairs of ball grooves simultaneously stop against the end stops. As a result of the balls stopping against the ends of the ball grooves, the rotating masses of the system, i.e. the rotatable one of the discs, the gears of the gear drive and the shaft of the motor together with the rotor mass, are stopped abruptly.

The impact generated by the abrupt stopping of the rotating masses can lead to tooth rupture at the motor pinion or at the gear set, or to other mechanical damage. Accordingly, there exists a need for an improved stopping mechanism which accommodates impacts generated during braking of the rotating masses.

SUMMARY OF THE INVENTION

The present invention provides an axial setting device which is able to accommodate in a damage-free way the impact generated when the above-mentioned rotating masses are braked when the balls stop against the end stops in the ball grooves.

The present invention provides a second spring mechanism which is inserted between the disc supported with respect to rotation and the housing and which, during the return movement of the drivable disc, after the balls have reached their end position defined by end stops in the ball grooves, permits overshooting of the drivable disc together with the disc supported with respect to rotation against elastic returning forces of the second spring. To a limited extent, this allows further rotation of the motor which is de-energized, at the latest, when the end stops are reached. Optionally, the motor can be electrically braked. No mechanical overloading occurs in the driveline of the drivable disc, as the rotating masses are spring-suspended, and can additionally be braked in a damped way.

In one embodiment, the rotatingly drivable disc, at the same time, is the disc which is axially displaceable against the returning forces of the first spring; and the disc supported with respect to rotation, at the same time, is the disc which is axially supported in the housing. In this way, axial bearing means for the latter disc relative to the housing can be eliminated.

According to a further embodiment, the disc supported with respect to rotation is held in the sense of rotation between a rotary stop in the housing and the second spring supported in the housing. The disc is arranged so as to be rotatable against returning forces of the second spring during overshooting. The second spring, more particularly, can be formed by a helical pressure spring arranged tangentially relative to the disc, wherein the helical pressure spring is supported directly in the housing and cooperates with a cam on the disc held with respect to rotation.

According to another embodiment, the second spring is formed by an elastic rubber element or plastic element which is inserted directly into the housing and cooperates with a cam at the disc held with respect to rotation.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

In the following description, various operating parameters and components are described for one constructed embodiment of the axial setting device. These specific parameters and components are including as examples and are not meant to be limiting. That is, the spring-supported return arrangement described below can be advantageously employed in other motor drive shaft applications, including other axial adjusting device arrangements as will be understood to one of skill in the art.

Figure 1:
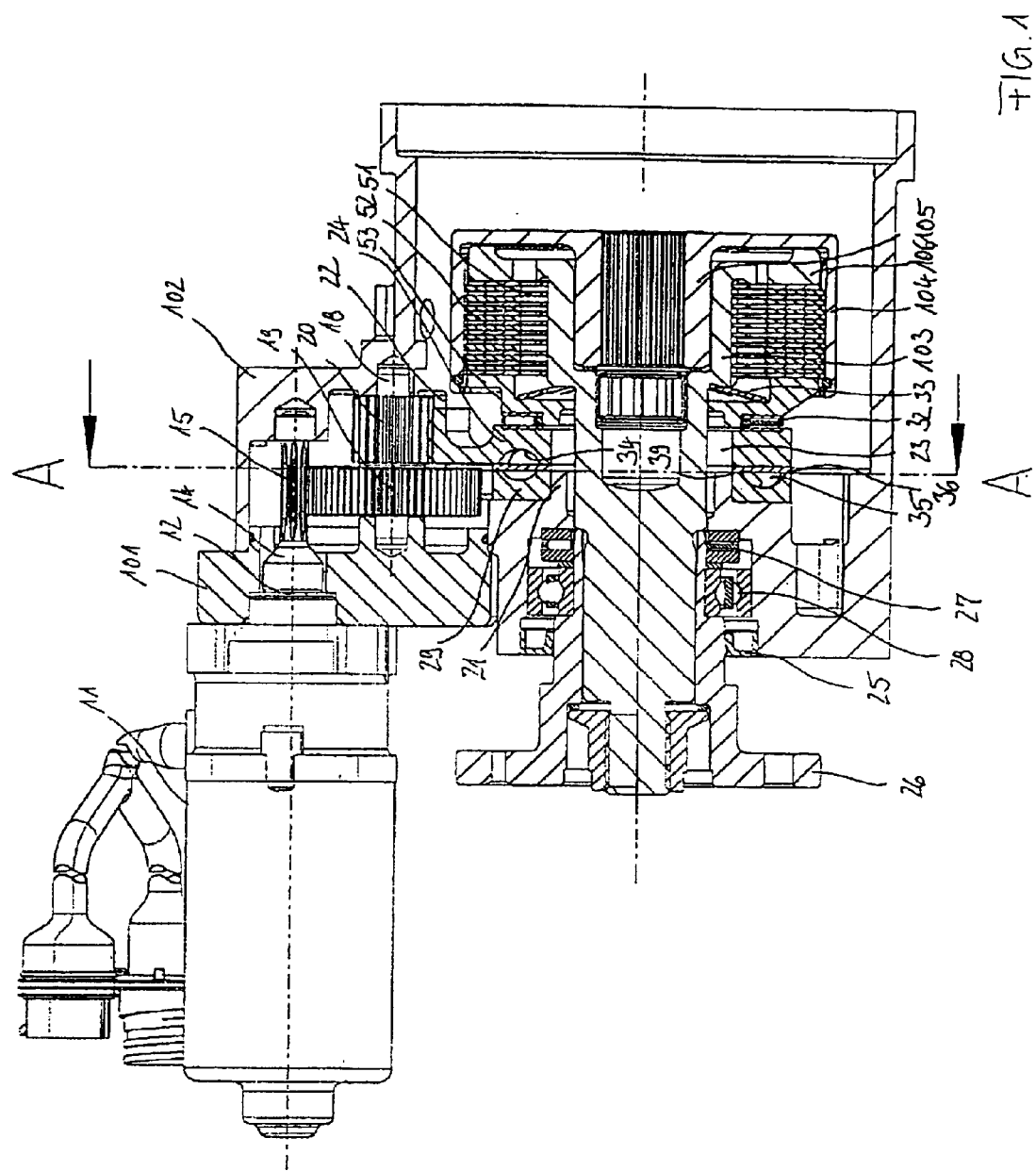
FIG. 1 shows a device according to an embodiment of the present invention in its entirety, in an axial section along sectional line B—B of FIG. 3.

FIG. 1 shows an axial setting device in accordance with an embodiment of the invention in an installed condition. The motor 11 is bolted to a motor carrier 101 through which there passes a motor shaft 12. The motor shaft 12 has been inserted into a drive and coupling housing 102. A shaft journal 14 with a driving pinion 15 has been placed on to the motor shaft 12. Into the carrier 101 and housing 102 there has been inserted a bearing journal 18 on which there is supported a first gear 19 which engages the pinion 15. Furthermore, the bearing journal 18 supports a second gear 20 which is connected to the first gear 19 in a rotationally fast way. The second gear 20 engages a tooth segment 22 which is firmly connected to a first disc 24 of the setting device. The first disc 24 is rotatably supported via a roller bearing 23 on a coupling hub 103. A flange 26 supported via an axial bearing 27 and a radial bearing 28 in the housing 102 has been bolted on to the coupling hub 103. The flange 26 is sealed by a seal or cover 25 relative to the housing 102. The rotatingly drivable first disc 24 cooperates with a second disc 29 which is rotatably supported on a projection 21 in the drive and coupling housing 102 and which is axially directly supported in the housing 102. In the faces of the first and second discs 24, 29 which face one another, there are provided pairs of grooves 34, 39 whose depth varies across the circumference and in which there run balls 35 which are held in a ball cage 36. The balls are positioned outside the sectional plane. The second disc 29 is supported in the housing 102 with respect to rotation, as will be shown later.

The coupling hub 103 is supported on a coupling carrier 104 which, via a hollow journal 105, engages the coupling hub 103. The coupling settable by the setting device comprises inner plates 51 and outer plates 52 of which the former are firmly connected to the coupling hub 103 while the latter are firmly connected to the coupling carrier 104. The inner and outer plates 51, 52 are axially supported on the coupling hub 103 formed as a flange 106 and are axially loaded by a pressure plate 53. The pressure plate 53 is supported via a first spring in the form of a plate spring 33 on the coupling hub 103. The pressure plate 53 is axially displaced by means of a needle bearing 32 which is loaded directly by the first disc 24. As a result of the axial displacement, the coupling carrier 104 is coupled via the plates to the coupling hub 103.

When the setting device is set positively by the motor 11, the setting action causes a rotation of the first disc 24, as a result of which the second disc 29, by means of the balls 35 running from deeper ball groove regions to flatter ball groove regions, is axially displaced on the coupling hub 103 against the returning forces of the plate spring 33. For the purpose of returning the setting device, the first disc 24 is rotated backwards by the motor 11 in the opposite direction of rotation until the balls 35 reach the end stops in the ball grooves 34, 39. The abrupt braking of the first disc 24 occurring as a result, is not directly transmitted to the rotor mass of the motor in that, with a pressure spring being shortened, the second disc 29 permits overshooting, so that the rotor mass of the motor and the drive masses are spring-suspended. Further details can be seen in FIG. 2. The motor is usually a pulse width modulated DC-electric motor although other types of electric motors may be employed.

Figure 2:
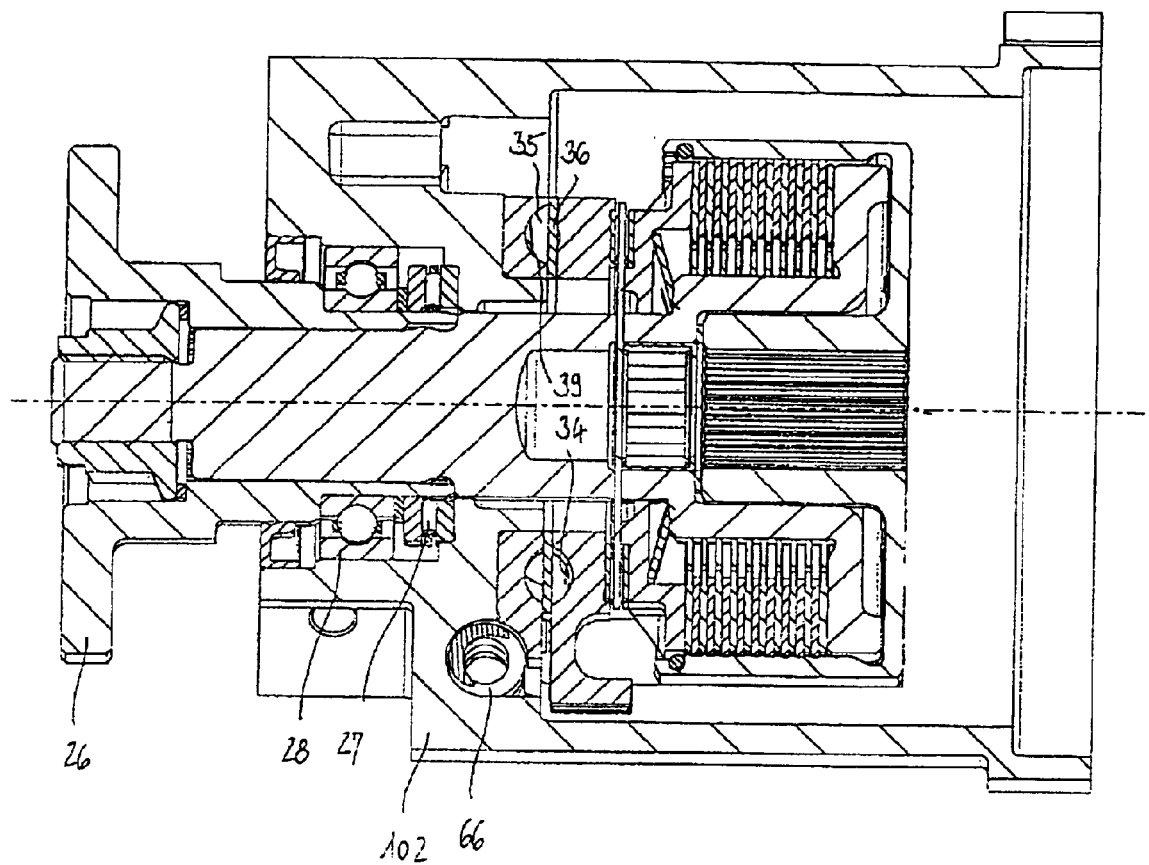
FIG. 2 shows the device of FIG. 1 in a partial view in an axial section along sectional line C—C of FIG. 3.
Figure 3:
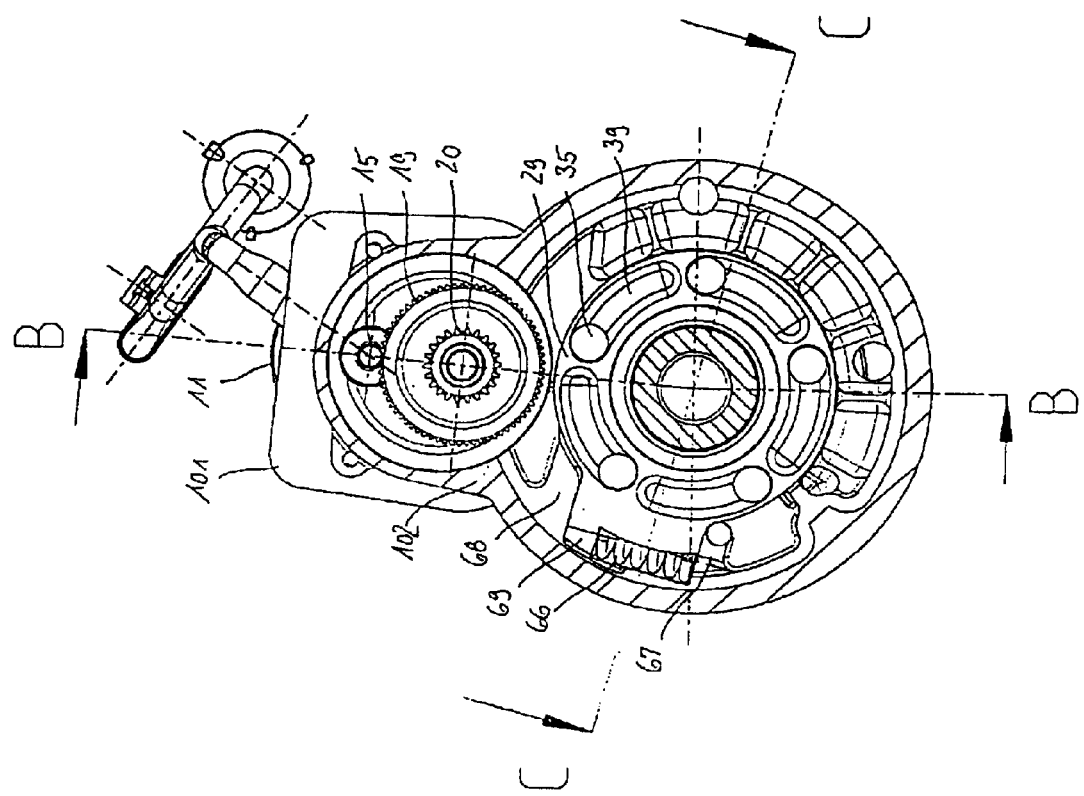
FIG. 3 shows the device according to FIG. 1 in a cross-sectional view along sectional line A—A.

FIG. 2 shows the coupling according to FIG. 1 in the form of an assembly in a longitudinal section taken along line C—C of FIG. 3. The motor and drive are not shown because they are positioned in a different plane (i.e., line B—B of FIG. 3). Identical details have been given the same reference numbers as in FIG. 1. To that extent, reference is made to the full contents of the preceding description. FIG. 2 shows that the second disc 29 which is axially supported in the housing 102 is supported with respect to rotation by a second spring in the form of a helical pressure spring 66 in the housing 102. The helical pressure spring 66 is inserted in such a way that it permits the second disc 29 to rotate together with the first disc 24 during the return movement when the balls reach the end stops in the ball grooves. Further details are to be gathered from FIG. 3.

FIG. 3 shows the previously illustrated drive in section along line A—A of FIG. 1. FIG. 3 shows the sectional line B—B which represents the axial section according to FIG. 1, as well as the sectional line C—C which represents the axial section according to FIG. 2. As in the previous Figures, identical details have been given the same reference numbers. To that extent, reference is made to the full contents of the previous description. It can be seen that the helical pressure springs 66 are positioned substantially tangentially relative to the second disc 29 which can be seen in a plan view together with the ball grooves 39 and the balls 35. The helical pressure spring 66 is supported counter-clockwise directly on a step 67 in the housing 102 and clockwise on a cam 69 which is formed on to the second disc 29. The cam 69, in turn, rests against a stop 68 in the housing 102. This means that when a pulse acts on the second disc 29 counter-clockwise, the cam 69 at the second disc 29 acts on the helical pressure spring 66 which is shortened elastically and supports itself on the step 67 in the housing 102. Thereafter, the second disc 29 springs back in the clockwise direction and again, together with the cam 69, rests against the stop 68 in the housing 102. Damping of the vibration process can be ensured via friction forces between the second disc 29 and the housing 102.

While the invention has been described in connection with several embodiments, it should be understood that the invention is not limited to those embodiments. For example, other types of spring mechanisms could be used for the first and second springs 33, 66. In one embodiment, the second spring 66 can comprise an elastic rubber element or plastic element which is inserted into the housing 102 and cooperates with the cam 69. Thus, the invention covers all alternatives, modifications, and equivalents as may be included in the spirit and scope of the appended claims.

What is claimed is:

1. An axial setting device comprising:

two discs (24, 29) which are rotatable relative to one another, which are supported coaxially relative to one another in a housing (102) and between which there are guided balls (35) in pairs of ball grooves (34, 39) whose depth varies across the circumference, one of the discs (24, 29) is axially supported and the other one of the discs (24, 29) is axially displaceable against elastic returning forces of a first spring (33), and one of the discs (24) can be rotatingly driven by a motor (11) via a gear drive, whereas the other one of the discs (29) is supported in the housing (102) with respect to rotation; and a second spring (66) which is inserted between the housing (102) and the disc (29) supported with respect to rotation which, during the return movement of the drivable disc (24), after the balls (35) have reached their end position defined by end stops in the ball grooves (34, 39), permits overshooting of the drivable disc (24) together with the disc (29) supported with respect to rotation against elastic returning farces of the second spring (66);

wherein the rotatingly drivable disc (24) is the disc which is axially displaceable against the returning forces of the first spring (33) and wherein the disc (29) supported with respect to rotation is the disc which is axially supported in the housing (102).

2. A device according to claim 1, wherein the second spring (66) is at least one helical pressure spring arranged tangentially relative to the disc (29) held with respect to rotation, and wherein the second spring (66) is supported in the housing (102) and cooperates with a cam (69) on the disc (29) held with respect to rotation.

3. A device according to claim 2, wherein the first spring (33) is at least one plate spring arranged concentrically relative to the discs (24, 29).

4. A device according to claim 1, wherein the second spring (66) is at least one elastic rubber element or plastic element which is inserted into the housing (102) and cooperates with a cam (69) at the disc (29) held with respect to rotation.

5. A device according to claim 4, wherein the first spring (33) is at least one plate spring arranged concentrically relative to the discs (24, 29).

6. A device according to claim 1, wherein the disc (29) supported with respect to rotation is held in the sense of rotation between a rotary stop (68) in the housing (102) and the second spring (66) supported in the housing, and wherein the disc (29) supported with respect to rotation is arranged so as to be rotatable against the returning forces of the second spring (66) during overshooting.

7. A device according to claim 1, wherein the first spring (33) is at least one plate spring arranged concentrically relative to the discs (24, 29).

8. An axial setting device comprising:

first and second discs (24, 29) which are rotatable relative to one another, which are supported coaxially relative to one another in a housing (102) and between which there are guided balls (35) in pairs of ball grooves (34, 39) whose depth vanes across the circumference, one of the discs (24, 29) is axially supported and the other one of the discs (24, 29) is axially displaceable against elastic returning forces of a first spring (33), the first disc (24) can be rotatingly driven by a motor (11) via a gear drive, and the second disc (29) is supported in the housing (102) with respect to rotation; and a second spring (66) inserted between the housing (102) and the second disc (29) and the housing (102) and which, during the return movement of the first disc (24), after the balls (35) have reached their end position defined by end stops in the ball grooves (34, 39), permits overshooting of the first disc (24) together with the Second disc (29) against elastic returning forces of the second spring (66);

wherein the first disc (24) is axially displaceable against the returning forces of the first spring (33) and the second disc (29) is axially supported in the housing (102).

9. A device according to claim 8, wherein the second spring (66) is a helical pressure spring arranged tangentially relative to the second disc (29), and wherein the second spring (66) is supported in the housing (102) and cooperates with a cam (69) on the second disc (29).

10. A device according to claim 9, wherein the first spring (33) is at least one plate spring arranged concentrically relative to the first and second discs (24, 29).

11. A device according to claim 8, wherein the second spring (66) is an elastic rubber element or plastic element which is inserted directly into the housing (102) and cooperates with a cam (69) at the second disc (29).

12. A device according to claim 11, wherein the first spring (33) is at least one plate spring arranged concentrically relative to the first and second discs (24, 29).

13. A device according to claim 8, wherein the second disc (29) is held in the sense of rotation between a rotary stop (68) in the housing (102) and the second spring (66) supported in the housing, and wherein the second disc (29) supported with respect to rotation is arranged so as to be rotatable against the returning forces of the second spring (66) during overshooting.

14. A device according to claim 8, wherein the first spring (33) is at least one plate spring arranged concentrically relative to the first and second discs (24, 29).

* * * * *

UNITED STATES PATENT AND TRADEMARK OFFICE
CERTIFICATE OF CORRECTION

PATENT NO. : 6,886,679 B2  
APPLICATION NO. : 10/744357  
DATED : May 3, 2005  
INVENTOR(S) : Alexey Katsnelson et al.

Page 1 of 1

It is certified that error appears in the above-identified patent and that said Letters Patent is hereby corrected as shown below:

In The Claims:  
Column 5, Line 36, should read as follows: -- 39) whose depth varies acrosse the circumference, one of --

In The Claims:  
Column 6, Line 4, should read as follows: -- and the second disc (29) and --

In The Claims:  
Column 6, Line 9, should read as follows: -- the second disc (29) against elastic returning forces of --

Signed and Sealed this

Seventh Day of August, 2007

JON W. DUDAS  
*Director of the United States Patent and Trademark Office*